Patented Feb. 21, 1939

2,147,789

UNITED STATES PATENT OFFICE 2,147,789

RESINS FROM AMINOPHENOLS AND FORMALDEHYDE

George De Witt Graves, Wilmington, Del., assignor to E. I. du Pont de Nemours & Company, Wilmington, Del., a corporation of Delaware No Drawing. Application May 29, 1936, Serial No. 82,651

17 Claims. (Cl. 260—51)

This invention relates to synthetic resins. More particularly it relates to acid-soluble amino nitrogen-containing resins prepared by condensing certain aminophenols with an aldehyde.

There are numerous examples in the literature and in the patent art of resins prepared by condensing phenols with aldehydes, particularly formaldehyde. There are likewise many examples of the preparation of resins from aromatic amines and aldehydes, particularly from aniline and formaldehyde. However, to my knowledge no one has heretofore disclosed a heat-hardening aminophenol-aldehyde type resin soluble in dilute aqueous acids and capable of being regenerated from its acid solutions in insoluble form by evaporating off the solvent and baking the residual resins at about 100° C.

One of the objects of this invention is the preparation of new synthetic resins. Another object is the preparation of synthetic resins which are soluble in dilute aqueous acids. A further object is the preparation of heat-hardening organic acid-soluble amino resins from certain aminophenols and aldehydes. Further objects will appear hereinafter.

These objects are accomplished by the following invention wherein an aliphatic aldehyde is reacted in a suitable medium with a tertiary aminophenol having at least two free reactive positions, and the resulting resinous reaction product is isolated. By "reactive positions" is meant the positions ortho and para to phenolic hydroxyl.

I have made the discovery that highly useful acid-soluble resins can be made by condensing aminophenols of the above type with formaldehyde. I make these resins in one way by adding the aldehyde, either as such or in the form of a solution in an appropriate solvent, to the cooled solution of the aminophenol in a suitable solvent, and refluxing the mixture until the resin forms. The mixture is cooled, the resin separated, ground, washed with cold water, and dried. It can then be dissolved, if desired, in an acid solution, such as aqueous acetic acid, and employed, in such solutions, as a coating composition and for many other purposes. It can be recovered from its acid solutions by evaporating off the solvent and heating at elevated temperatures until the solid resin remains.

The aminophenols used in this invention are tertiary, and the amino-nitrogen may be present in an open or closed chain structure. The aminophenols may be monohydric or polyhydric, mononuclear or polynuclear. If polynuclear, they may have condensed and/or non-condensed nuclei. The tertiary aminophenols must have at least two free reactive positions in the phenolic nucleus available for condensation with the aldehyde, if secondary. The other, or non-reactive, positions in the phenolic nucleus in any case may be unsubstituted or they may be occupied by substituent groups, such as alkyl, aryl, halogen, aralkyl, alkoxy, amino, and hydroxy alkyl. Examples of aminophenols which may be used in this invention are: 1-dimethylamino-2-hydroxymethyl - 4 - hydroxybenzene, p-(dimethylamino) - phenol, p - (dibenzylamino) - phenol, m-(diethylamino)- phenol, 8 - hydroxyquinoline, p-(hydroxyphenyl)-morpholine, p-(methylethylamino)-phenol, o-(dipropylamino)-phenol, 1-hydroxy-3-methyl-4-(diethylamino)-benzene, and 1 - hydroxy - 2 - (dimethylamino) - benzene. Of these tertiary aminophenols ("phenol" being used in its generic sense), I prefer the N-dialkyl mononuclear monohydric aminophenols in which each of the N-alkyl groups has less than four carbon atoms, the phenol having at least two free reactive positions. m-(Diethylamino)-phenol is typical of this class. Resins from formaldehyde and such phenols are very valuable in that they are characteristically more basic in being more readily soluble in aqueous mineral or organic acids (e. g., 1.5-10% aqueous acetic acid) and over a wider range of concentration than are the resins obtained from primary and secondary aminophenols or from tertiary aminophenols in which the N-alkyl radicals have a high molecular weight. They are at the same time more readily heat-hardenable in that they are capable of yielding films insoluble in dilute acids upon baking at 100° C. They are also soluble in dilute (5-10%) caustic alkali solutions, being sharply distinguished in this respect from the anilin-formaldehyde type of resin.

The reactions which occur when I condense aminophenols with formaldehyde are not definitely known and depend in part upon the nature of the aminophenol itself. When a tertiary aminophenol is reacted with formaldehyde, the reaction is probably a simple phenol-formaldehyde type condensation in which the amino groups are non-reactive, this being due to the absence of amino hydrogen atoms. When primary or secondary amines are used, the reactions probably are not so simple since the amino hydrogen atoms undoubtedly take part therein. Several types of reactions, depending on the number of free reactive positions, may occur simultaneously; namely, (1) the usual phenol-formaldehyde type condensation, the amine groups being unaffected; (2) the usual aniline-formaldehyde type condensation leading to the formation of compounds of the type of anhydro-formaldehyde aminophenol ($HO.C_6H_4.N=CH_2$) and through them to aniline-formaldehyde type resins; (3) formation of methylolaminophenols which condense with free reactive positions in other aminophenol nuclei, the resulting compounds then condensing to form resinous substances, viz.:

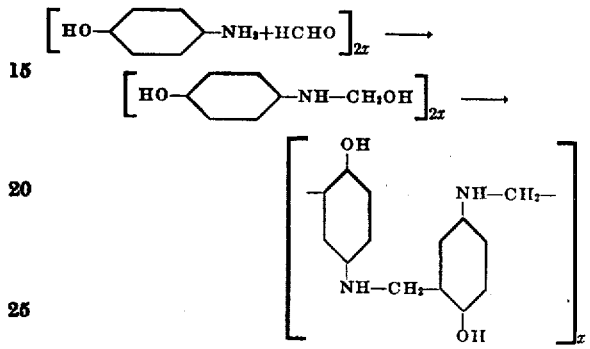

and similarly for secondary aminophenols.

While the invention is susceptible to considerable variation and modification in the manner of its practical application, particularly as regards the kind and amount of reactants, and the conditions of reaction such as temperature and reaction medium, the following examples will serve to illustrate how the invention may be practised.

Example I

To a cold solution of 64 grams (0.388 mol) of m-diethylaminophenol in 100 cc. of ethanol is added, with stirring, 37.7 grams (0.465 mol) of 37% aqueous formaldehyde. The solution is heated under reflux in a bath of boiling water for one and one-half hours. A viscous, oily product forms which sets to a brittle resinous mass when allowed to cool. The cooled resin is separated from the rest of the reaction mixture, and is ground in a mortar with cold water to a uniform slurry. The resin is then filtered, washed thoroughly with cold water, and dried in vacuo at room temperature. It is soluble in a stoichiometrical excess of 1.5% aqueous acetic acid, also in many organic solvents, among them acetone, dioxan, ethyl acetate and ethanol. A film flowed from a solution of the resin in 1.5% aqueous acetic acid hardened to insolubility in such acid upon heating at 100° C. for four hours.

Example II

To a solution of 36.5 grams (0.25 mol) of 8-hydroxy-quinoline in 200 cc. of 95% ethanol at 35°–40° C. is added 24.5 grams (0.3 mol) of 37% aqueous formaldehyde. The solution is heated with stirring under a reflux condenser at 80°–82° C. for four hours, after which 32.4 grams (0.4 mol) of 37% formaldehyde and 1.5 cc. of 29% aqueous ammonia are added. Heating and stirring are continued for eighteen hours. The mixture is then diluted with about twice its volume of water, the aqueous layer decanted from the resulting thick, oily precipitate, and the latter washed with water and dried in vacuo at room temperature. The product is a soft, sticky, semi-transparent mass. It is soluble in strong acetic acid, 2% hydrochloric acid, 5% sodium hydroxide, dioxane, and chloroform, and insoluble in weak acetic acid, ethanol, acetone, toluene, ethyl acetate, and gasoline. It is precipitated from solution in 5% sodium hydroxide by dilute hydrochloric acid but is redissolved by an excess of the acid.

Example III

Example I is repeated, p-dimethylaminophenol being substituted in the same molar proportions for the m-diethylaminophenol. A resinous product is obtained soluble in 2% aqueous acetic acid and having otherwise essentially the same solubility and heat-hardening properties as the resin in Example I.

Example IV

Example I is repeated, 1-(dimethylamino)-2-methyl-4-hydroxybenzene being used instead of the m-diethylaminophenol. A resin similar in its properties to the resin of Example I is obtained.

Example V

Example II is repeated, using p-hydroxyphenylmorpholine instead of 8-hydroxyquinoline. A resin is obtained which resembles the resin described in Example II and has similar solubility characteristics.

Example VI

One mol of m-diethylaminophenol and one mol of paraldehyde are slowly mixed and well stirred. A small amount of concentrated hydrochloric acid is added with stirring and the mixture refluxed until resinification is complete. It is then exactly neutralized with dilute caustic soda, washed and dried. The product is a moderately brittle resin, soluble in dilute acids, which slowly insolubilizes on heating.

In place of the formaldehyde of the preceding examples, paraformaldehyde or other substances yielding formaldehyde such as methylene chloride and hexamethylene-tetramine may be used. Other aldehydes such as acetaldehyde, paraldehyde and furfural may be used in place of formaldehyde.

The proportions of aminophenol and formaldehyde to be used in this invention will depend upon the type of resins desired as well as upon the character of the aminophenol used. In general, at least one mol of formaldehyde per mol of aminophenol should be used to obtain resins, and to obtain heat-hardening resins from 1.5–2.0 mols or more of formaldehyde should be employed. Example I illustrates my preference as regards proportions of reactants. The amount of formaldehyde to be used will also depend frequently on the number of free reactive positions, lesser amounts of formaldehyde being needed to secure a given result as the number of such positions increases.

Reaction temperatures may be varied considerably. It is better not to heat the reactants above about 100° C. because of the relative instability of aminophenols and their tendency to oxidize in air. In fact, it is convenient to conduct the reaction in the presence of an inert gas such as nitrogen in order to prevent oxidation of the aminophenol and consequent excessive discoloration and degradation of the resin.

Solvents such as ethanol are generally desirable, but may be dispensed with provided the aldehyde to be reacted with the aminophenol is liquid or is used, as in the case of aqueous formaldehyde, in aqueous solutions.

If desired, part of the aminophenol may be replaced by modifying agents such as phenols, thiourea, urea or p-toluene-sulfonamide. These materials react with formaldehyde to form resinous materials which may condense or interpolymerize with the aminophenol-formaldehyde condensation products to form modified resins which are useful for many of the purposes outlined below for the aminophenol-formaldehyde resins themselves.

Salts of the aminophenols may be used in the preparation of resins in lieu of the free aminophenols. The use of aminophenol salts is especially advantageous as a means of dissolving aminophenols which are insoluble in water (which may be used as the reaction medium). That is, in such cases the aminophenols can conveniently be dissolved in dilute acids and reacted in solution therein with the aldehyde. While solutions of the aminophenol in aqueous mineral or organic water-soluble acids may in general be used, acetic acid solutions are preferred from the standpoints of consistency of results and ease of reaction. Other acids, however, are suitable, among them the inorganic acids hydrochloric, hydrobromic, sulfuric, phosphoric, and in some instances sulfurous and carbonic, and the organic acids formic, glycollic, lactic, chloroacetic, oxalic, tartaric and propionic. The acid should dissolve the aminophenol and should be water-soluble to at least some extent.

Resins prepared without first forming the salt of the aminophenol may be dissolved or dispersed in the above acids. Resins from the preferred N-(dialkylamino)-phenols previously mentioned are particularly soluble in various concentrations of these acids. Such solutions are, in fact, the form in which these resins find their greatest utility.

The resins described herein have a wide variety of uses. They may be artificially shaped, as molded, or cast into self-supporting films. Their most valuable application, however, is as coating compositions, this being especially true for those which are soluble in dilute aqueous acids, e. g., those from the short chain N-dialkylaminophenols and formaldehyde. Such coating compositions may range in character from simple solutions of the resin in an organic solvent or an aqueous acid to compositions which contain only a small amount of the resin or acid salt thereof. Typical of the latter are coating compositions in which the resin is present as a dispersing and/or emulsifying agent such as (a) aqueous emulsions of materials liquid under conditions of emulsification such as oils and waxes, (b) aqueous dispersions of materials solid under conditions of dispersion such as pigments, (c) aqueous media containing both solids and liquids. It will be understood that specific resins will be particularly well suited for specific applications, and that the aforesaid compositions may contain, when desirable, appropriate auxiliary agents such as mold or mildew inhibitors, wetting agents, antioxidants, plasticizers, insecticides, adhesives, other film-forming materials, thickeners, and the like.

Compositions containing the present aminoresins are valuable for all varieties of coating, this word being used in its broadest sense to mean applications, not only to impervious surfaces such as glass and metal, but also to porous or fibrous bodies such as wood, brick, plaster, paper, paper pulp, asbestos, felt, cotton, wool, regenerated cellulose, etc., and articles of manufacture therefrom, such as textiles. The above coating compositions also have valuable adhesive properties and the various coated materials just mentioned may be readily glued to themselves or to one another, usually with application of heat.

Specific uses for which these coating compositions are suitable are as follows: as sizes for rayon tire cord to improve its adhesion to rubber; as sizes for transparent sheets of regenerated cellulose to improve the anchorage thereto of printing inks and lacquers; as water-proof glues in the manufacture of veneers; as sizes and water-proofers for textiles; as fixatives for acid dyes to paper and rayon; as a beater size in the manufacture of chalk-filled paper; as agents for sizing and delustering fabrics and for affixing water-insoluble solids thereto; and as stabilizers for acid-yielding film systems, such as those having therein chlorine-containing solvents, plasticizers, resins, and rubbers.

While I have described certain important and specific applications of the invention, yet it will be understood that modifications and variations can be made without departing from its spirit and scope as set forth in the appended claims.

I claim:

1. The process which comprises reacting in a liquid medium as sole reactants at least one mol of an aliphatic aldehyde with one mol of a tertiary aminophenol taken from the group consisting of N-dialkylaminophenols, hydroxyquinolines and hydroxyphenylmorpholines having at least two free reactive positions, while maintaining the reaction under reflux conditions until a resin forms.

2. The process which comprises reacting in an organic solvent as sole reactants at least one mol of formaldehyde and one mol of a tertiary aminophenol taken from the group consisting of N-dialkylaminophenols, hydroxyquinolines and hydroxyphenylmorpholines having at least two free reactive positions, while maintaining the reaction under reflux conditions until a resin forms.

3. The process which comprises reacting in an organic solvent as sole reactants from one to two mols of formaldehyde and one mol of a tertiary aminophenol taken from the group consisting of N-dialkylaminophenols, hydroxyquinolines and hydroxyphenylmorpholines having at least two free reactive positions, while maintaining the reaction under reflux conditions until a resin forms.

4. The process which comprises reacting in an organic solvent as sole reactants at least one mol of an aliphatic aldehyde and one mol of a mononuclear monohydric N-dialkylaminophenol having at least two free reactive positions, each N-alkyl group containing less than 4 carbon atoms, while maintaining the reaction under reflux conditions until a resin forms.

5. The process which comprises reacting in an aqueous organic solvent as sole reactants at least one mol of formaldehyde and one mol of a mononuclear, monohydric N-dialkylaminophenol having at least 2 free reactive positions, each N-alkyl group containing less than 4 carbon atoms, while maintaining the reaction under reflux conditions until a resin forms.

6. The process which comprises reacting in an aqueous organic acid solution as sole reactants from 1 to 2 mols of formaldehyde and one mol of a mononuclear monohydric N-dialkylaminophenol having at least two free reactive positions, each N-alkyl group containing less than 4 carbon atoms, while maintaining the reaction under reflux conditions until a resin forms.

7. The process which comprises reacting in an ethyl alcohol solution as sole reactants from 1 to 2 mols of formaldehyde and one mol of a mononuclear monohydric N-dialkylaminophenol having at least 2 free reactive positions, each N-alkyl group containing less than four carbon atoms, while maintaining the reaction under reflux conditions until a resin forms.

8. The process which comprises reacting in an aqueous acetic acid solution as sole reactants from 1 to 2 mols of formaldehyde and 1 mol of a mononuclear monohydric N-dialkylamino phenol having at least 2 free reactive positions, each N-alkyl group containing less than 4 carbon atoms, while maintaining the reaction under reflux conditions until a resin forms.

9. The process which comprises reacting in an ethyl alcohol solution as sole reactants, at least one mol of formaldehyde with one mol of m-(diethylamino) phenol, while maintaining the reaction under reflux conditions until a resin forms.

10. The process which comprises reacting in an aqueous acetic acid solution as sole reactants from 1 to 2 mols of formaldehyde with one mol of m-(dimethylamino) phenol, while maintaining the reaction under reflux conditions until a resin forms.

11. The process which comprises reacting in an aqueous ethyl alcohol solution as sole reactants from 1 to 2 mols of formaldehyde with 1 mol of 8-hydroxyquinoline, while maintaining the reaction under reflux conditions until a resin forms.

12. The products obtainable by the process of claim 1 which are further characterized by being resinous, soluble in dilute aqueous acids and heat-hardenable.

13. The products obtainable by the process of claim 4 which are further characterized by being resinous, soluble in dilute aqueous acid solutions and heat hardenable.

14. A solution in an aqueous acid of the resinous products obtainable by the process of claim 1.

15. The resinous products obtainable by the process of claim 9.

16. The resinous products obtainable by the process of claim 10.

17. The resinous products obtainable by the process of claim 11.

GEORGE DE WITT GRAVES.

---

CERTIFICATE OF CORRECTION.

Patent No. 2,147,789. February 21, 1939.

GEORGE DE WITT GRAVES.

It is hereby certified that error appears in the printed specification of the above numbered patent requiring correction as follows: Page 1, second column, line 5, strike out the comma and words ", if secondary"; and that the said Letters Patent should be read with this correction therein that the same may conform to the record of the case in the Patent Office.

Signed and sealed this 18th day of April, A. D. 1939.

Henry Van Arsdale (Seal) Acting Commissioner of Patents.

mols of formaldehyde and one mol of a mononuclear monohydric N-dialkylaminophenol having at least 2 free reactive positions, each N-alkyl group containing less than four carbon atoms, while maintaining the reaction under reflux conditions until a resin forms.

8. The process which comprises reacting in an aqueous acetic acid solution as sole reactants from 1 to 2 mols of formaldehyde and 1 mol of a mononuclear monohydric N-dialkylamino phenol having at least 2 free reactive positions, each N-alkyl group containing less than 4 carbon atoms, while maintaining the reaction under reflux conditions until a resin forms.

9. The process which comprises reacting in an ethyl alcohol solution as sole reactants, at least one mol of formaldehyde with one mol of m-(diethylamino) phenol, while maintaining the reaction under reflux conditions until a resin forms.

10. The process which comprises reacting in an aqueous acetic acid solution as sole reactants from 1 to 2 mols of formaldehyde with one mol of m-(dimethylamino) phenol, while maintaining the reaction under reflux conditions until a resin forms.

11. The process which comprises reacting in an aqueous ethyl alcohol solution as sole reactants from 1 to 2 mols of formaldehyde with 1 mol of 8-hydroxyquinoline, while maintaining the reaction under reflux conditions until a resin forms.

12. The products obtainable by the process of claim 1 which are further characterized by being resinous, soluble in dilute aqueous acids and heat-hardenable.

13. The products obtainable by the process of claim 4 which are further characterized by being resinous, soluble in dilute aqueous acid solutions and heat hardenable.

14. A solution in an aqueous acid of the resinous products obtainable by the process of claim 1.

15. The resinous products obtainable by the process of claim 9.

16. The resinous products obtainable by the process of claim 10.

17. The resinous products obtainable by the process of claim 11.

GEORGE DE WITT GRAVES.

---

CERTIFICATE OF CORRECTION.

Patent No. 2,147,789. February 21, 1939.

GEORGE DE WITT GRAVES.

It is hereby certified that error appears in the printed specification of the above numbered patent requiring correction as follows: Page 1, second column, line 5, strike out the comma and words ", if secondary"; and that the said Letters Patent should be read with this correction therein that the same may conform to the record of the case in the Patent Office.

Signed and sealed this 18th day of April, A. D. 1939.

Henry Van Arsdale (Seal) Acting Commissioner of Patents.